United States Patent Office 2,964,564
Patented Dec. 13, 1960

2,964,564

POLYETHER SULFURIC ACID ADDITION COMPOUNDS

Bruno Blaser, Dusseldorf-Urdenbach, and Gunther Tischbirek, Dusseldorf-Benrath, Germany, assignors to Henkel & Cie. G.m.b.H., Dusseldorf-Holthausen, Germany, a corporation of Germany No Drawing. Filed Sept. 14, 1953, Ser. No. 380,082

Claims priority, application Germany Sept. 16, 1952

4 Claims. (Cl. 260—584)

This invention relates to and has as its object the preparation of polyether sulfuric acid addition compounds.

It is known to react sulfonating agents with compounds containing hydroxyl groups at the end of polyether chains in order to convert the hydroxyl groups into sulfate groups. When effecting this reaction using sulfonating agents having a stronger action than concentrated sulfuric acid, at most an excess 0.3 mol of the sulfonating agent was conventionally used.

It has now been found, in accordance with the invention, that valuable addition products may be produced when using larger quantities of such sulfonating agent.

The addition products, in accordance with the invention, are organic polyethers containing at least three ether oxygen atoms which have at least three sulfuric acid radicals molecularly bound in the form of an addition compound to ether oxygen atoms.

By polyethers there specifically is meant compounds containing at least three up to 25–30 ether groups in one polyether chain. The polyether chain may have a molecular weight from about 150 up to 15,000.

The addition compounds are formed by adding an excess of at least 3 mols of sulfonating agent over the quantity of sulfonating agent which is required for complete saturation of the groups possibly present in the polyether molecule which have a preferred reaction for the sulfonating agent such as hydroxyl groups.

The starting polyethers may, for example, be addition products of alkylene oxides with organic compounds having active hydrogen atoms as, for example, alcohols, phenols, carboxylic acid, amines, carboxylic acid or sulfonic acid amides, mercaptans, sulfinic acids, etc. The groups having active hydrogen atoms, possibly a plurality of such groups possibly differing one from the other, may also be present in the molecules. These groups may be bound to an aromatic aliphatic or cycloaliphatic radicals, as well as on radicals which contain hetero-atoms which are present in the molecules.

The starting polyethers preferably have the general formula:

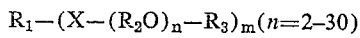

$$R_1-(X-(R_2O)_n-R_3)_m (n=2-30)$$

in which $R_1$ and $R_3$ are hydrogen or organic radicals, X is oxygen, sulfur or secondary or tertiary amino radicals, $R_2$ is an alkyl radical having 2 to 4 carbon atoms, $m$ is an integer of from 1 to 3, and $n$ is an integer of from 3 to 30. It is specifically understood in the general formula as used above and in the claims, that the term $(R_2O)_n$ does not necessarily designate the same $R_2O$ radical $n$ times, but may designate $n$ number of different or same $R_2O$ radicals. Thus, for example, if $n$ is 3, $R_2$ may be a methyl, ethyl and propyl radical. Thus different radicals of $R_2$ may be bound in a polyether chain such as mixed addition products of ethylene oxide and propylene oxide. The starting products may not only be prepared by adding alkylene oxides to compounds having reactive hydrogen atoms, but also by reacting polyether compounds or their hydrohalide esters with organic compounds which contain a reactive hydrogen atom bound to oxygen, sulfur or nitrogen.

The addition products, in accordance with the invention, are adducts of the above mentioned polyethers having a sulfuric acid radical bound to at least three oxygen atoms of the ether linkages. The addition products are formed by adding sulfonating agents which have a stronger action than concentrated sulfuric acid such as chlorosulfonic acid, oleum or sulfur trioxide to the starting polyethers. The amount of the sulfonating agent added must be such that there is at least three mols of the sulfonating agent available for the ether oxygen. If desired, enough sulfonating agent to add a sulfuric acid radical to each of the ether oxygen atoms (from 3 up to 30) may be used.

The reaction is preferably effected by slowly adding the sulfonating agent to the polyether which possibly may be in molten form. If the polyether contains free hydroxyl groups at the end of the chain, the added sulfonating agent will preferably add to this free hydroxyl group forming a sulfate, i.e. a sulfuric acid semi-ester. In addition to the amount of sulfonating agent required to form this sulfate, the addition compound is formed by having a sufficient molar excess of the sulfonating agent present so as to add a sulfuric acid radical from the sulfonating agent to at least three of the ether oxygen linkages present in the polyether. Amine or amide nitrogen atoms also have a preferred action for the sulfonating agent added. Only after these groups have been completely saturated does the excess of sulfonated agent added become available for the formation of the addition products. If polyethers are used which do not have any groups which have a preferred reaction with the sulfonating agent, as, for example, bilaterally etherified polyglycol ether, then the sulfonating agent will immediately add to the ether oxygens to form the addition compounds. The ratio of added sulfonating agent to the ether oxygens can vary between three mols of sulfonating agent, sufficient acid radicals to at least three ether oxygen linkages, up to a mol of sulfonating agent for each ether oxygen atom present in the polyether.

It is possible to effect the addition of the sulfonating agent in the presence of solvents which are stable with respect to the sulfonating agent as, for example, sulfur dioxide, carbon disulfide and certain chlorinated and/or fluorinated hydrocarbons such as trichlorethylene.

The reaction is exothermic and the heat produced may be led away by cooling, boiling of the solvent or by any other conventional measures. The reaction may be carried out at temperatures between $-50°$ C. and $+60°$ C. and preferably temperatures between $-20°$ C. to $+40°$ C.

The new addition compounds or adducts formed in accordance with the invention are completely colorless and range from relatively viscous masses to masses of waxlike consistency. The consistency of the product depends on the nature of the organic radicals $R_1-R_3$ contained in the initial polyethers and on the number of ether oxygen atoms present. Compounds having relatively few ether oxygen atoms in the molecule give oily products. With an increase in the number of the ether oxygen atoms, the viscosity of the reaction product also increases. Inasmuch as the sulfuric acid radicals are present in bound form, the compounds are less corrosive than the free sulfonating agents and, therefore, may be handled more easily and with less danger. Upon contact with water, the addition compounds decompose forming sulfuric acid solutions, and thus the addition compounds, in accordance with the invention, are highly valuable for the preparation of pickling or cleaning fluids for metals or for other purposes. Inasmuch as water-soluble organic solvents are frequently added to metal cleaning agents, the sulfonated organic compounds possibly remaining in the solution in many cases, are highly desirable. If the polyalkyl ethers used are of a higher molecular weight, they improve the viscosity, dirt-carrying capacity or wetting power of the solution.

The following examples are given by way of illustration and not limitation.

*Example 1*

To 30 grams of a polyethylene oxide having an average molecular weight of 300 and the general formula:

$$HO-CH_2-CH_2-O(CH_2-CH_2-O)_n-CH_2-CH_2OH$$

$$(n=4-5)$$

there are added 70 grams chlorosulfonic acid with good agitation. The reaction heat given off is led away by cooling so that the temperature does not exceed 30° C. A practically colorless oily compound is formed which contains the greatest part of the chlorosulfonic acid in the form of the addition compound which can easily be split off.

*Example 2*

To 36 grams of monomethyl ether of a polyethylene oxide having an average molecular weight of 360 and the general formula:

$$CH_3-O(CH_2-CH_2O)_n-CH_2-CH_2OH$$

such as obtained by the reaction of ethylene oxide on monomethylglycol ether, there are added 90 grams chlorosulfonic acid while cooling with water and agitating well. At temperatures of 30 to 40° C., there is formed the colorless oily compound which is stable when moisture is excluded. Upon introducing it into water, there is obtained a sulfuric acid and hydrochloric acid solution of the sulfonated polyglycol ether which can be used, possibly after the addition of acid inhibitors, as pickling or metal cleaning agent.

Similar products are obtained if 45 grams of the polyglycol monomethyl ether and 70 to 80 grams of chlorosulfonic acid are treated in the same manner.

*Example 3*

Ten grams of a polyethylene oxide of an average molecular weight of 5000 are dissolved in 50 milliliters liquid sulfur dioxide at −15° C. and a solution of 20 grams sulfur trioxide in 50 grams liquid sulfur dioxide is added with agitation. A practically colorless viscous oil which contains a very large portion of the added sulfur trioxide in bound form is obtained with a strong generation of heat which is removed by boiling of the sulfur dioxide. Any traces of solvent which are still present are advisedly distilled off. A similar product is obtained if 20 grams of a pulverized polyethylene oxide having the average molecular weight of 9000 are stirred with 45 grams chlorosulfonic acid at temperatures of up to 40° C.

*Example 4*

To 59.2 grams of an addition product of 8–9 mols ethylene oxide on a fatty alcohol mixture of chain length $C_{12}$–$C_{18}$ which has been prepared by the reduction of cocoanut oil acid (hydroxyl number of the polyether: 94.8), there are added with agitation and external cooling of the reaction vessel by means of water, 81.6 grams of chlorosulfonic acid, the addition being effected so slowly that the temperature does not rise above +35° C. There is obtained a light yellow oil. The hydrochloric acid released upon the esterification of the end OH groups may lead to the formation of a foam which can be removed by applying a vacuum or by heating gently. If the addition product is dissolved in water, there is obtained a hydrochloric acid and sulfuric acid solution of the sulfonated ethylene oxide addition product of capillary activity.

*Example 5*

To 68 grams of an end methyl etherified addition product of about 10 mols ethylene oxide on the alcohol mix mentioned in Example 4, there are slowly added with stirring and cooling 116 grams chlorosulfonic acid. There is produced a practically colorless oil which contains almost the entire chlorosulfonic acid bound in the form of an addition product. Upon dissolving the product in water, the addition product is split and the initial polyether is again obtained.

*Example 6*

Sixty-two grams of an addition product of 5–6 mols ethylene oxide on an alkylbenzol sulfamide, which has been prepared from a technical alkylbenzol mixture with 14–18 carbon atoms in the alkyl radical, are dissolved in 200 milliliters liquid sulfur dioxide and 58 grams of chlorosulfonic acid are slowly added while stirring. The reaction heat produced is removed by boiling the sulfur dioxide. After evaporation of the remaining sulfur dioxide, there remains an orange oil which is only slightly sulfonated in the benzene nucleus and contains the greatest part of the chlorosulfonic acid bound in the form of an addition product.

*Example 7*

To 53 grams of an addition product of about 10 mols ethylene oxide on a cocoanut oil acid amide of the chain length $C_{12}$–$C_{18}$, there are added while stirring well and gently cooling, 116 grams of chlorosulfonic acid. The temperature in this connection should not exceed +40° C. After expelling the hydrochloric acid which has been released upon the esterification of the end OH groups, there is obtained an orange oil which contains about 90% of the added chlorosulfonic acid bound in the form of an addition product.

*Example 8*

Seventy-three grams of an addition product of about 12 mols ethylene oxide on a dodecyl mercaptan are dissolved in 200 milliliters liquid sulfur dioxide at −15° C. and 139 grams chlorosulfonic acid are added while stirring. The reaction heat produced is removed by evaporating the sulfur dioxide. After completion of the addition, the remaining sulfur dioxide is evaporated. There remains a slightly yellow oil which contains about 90% of the added chlorosulfonic acid in a form which can easily be split off.

The 200 milliliters liquid sulfur dioxide can be replaced by 150 milliliters 1,2 dichlorethane. In this case, the temperature must be kept below +30° C. by cooling.

When oleum is used, the molecular ratios are calculated on the basis of sulfuric acid radicals being present in the oleum.

We claim:

1. As a new chemical compound, a polyether addition compound having individual sulfuric acid radicals molecularly bound to at least three ether oxygen atoms.

2. A compound according to claim 1 in which the number of sulfuric acid radicals present is 50 to 100% of the ether oxygen atoms present in the molecule.

3. As a new chemical compound, an addition compound of a polyether having sulfuric acid radicals molecularly bound to at least three ether oxygen atoms in an amount of at least three sulfuric acid radicals per polyether molecule of the general formula:

$$R_1-[X-(R_2O)_n-R_3]_m$$

in which $R_1$ and $R_3$ are members selected from the group consisting of alkyl and alkanol radicals, X is a member selected from the group consisting of oxygen, sulfur and nitrogen, $R_2$ is an alkyl radical having two to four carbon atoms, $m$ is an integer of from one to three and $n$ is an integer from three to thirty, said addition compound having individual sulfuric acid radicals molecularly bound to at least three ether oxygen atoms.

4. A compound according to claim 3 in which the number of sulfuric acid radicals present is 50 to 100% of the ether oxygen atoms present in the molecule.

References Cited in the file of this patent

UNITED STATES PATENTS

| | | |
|---|---|---|
| 1,931,491 | Haussmann | Oct. 24, 1933 |
| 2,174,761 | Schuette et al. | Oct. 3, 1939 |
| 2,644,833 | Kosmin | July 7, 1953 |
| 2,647,913 | Kosmin | Aug. 4, 1953 |

FOREIGN PATENTS

| | | |
|---|---|---|
| 380,851 | Great Britain | Sept. 12, 1932 |

OTHER REFERENCES

Lucas: Organic Chemistry (1935), American Book Co., New York City, page 202.

UNITED STATES PATENT OFFICE
CERTIFICATION OF CORRECTION

Patent No. 2,964,564                           December 13, 1960

Bruno Blaser et al.

It is hereby certified that error appears in the above numbered patent requiring correction and that the said Letters Patent should read as corrected below.

In the grant (only), line 2, address of second inventor, for "Dusselford-Benrath" read -- Dusseldorf-Benrath --; column 2, line 13, for "oxygen" read -- oxygens --; line 40, before "acid radicals" insert -- to add sulfuric --.

Signed and sealed this 16th day of May 1961.

(SEAL)
Attest:

ERNEST W. SWIDER                                  DAVID L. LADD
Attesting Officer                                    Commissioner of Patents